United States Patent Office 2,703,789
Patented Mar. 8, 1955

2,703,789

CATALYST PREPARATION

Joseph B. McKinley and William A. Pardee, Pittsburgh, Pa., assignors to Gulf Research & Development Company, Pittsburgh, Pa., a corporation of Delaware No Drawing. Application April 23, 1951,
Serial No. 222,521

8 Claims. (Cl. 252—455)

This invention relates to an improved method for preparing catalysts containing combinations of the oxides of nickel and tungsten deposited on a porous carrier or support.

It is necessary to have the nickel and tungsten components of such a catalyst uniformly intermixed and uniformly deposited on the carrier in order to obtain full activity. Also it is usually necessary to deposit both nickel and tungsten components in a predetermined ratio. Furthermore good penetration of the pores of the support by the impregnating medium is necessary in order to obtain approximately equal distribution throughout the support. Conventional methods of impregnating have not satisfied these requirements. For instance deposition of a nickel salt followed by depositing a tungsten compound or vice versa does not give uniform deposition. One of the components will be deposited nearer the core of the support and therefore the necessary close intermixed relation between the two metal compounds is not obtained. Simultaneous deposition of both components has been attempted; however results have not been satisfactory primarily due to the difficulty of maintaining both components in solution during the impregnation. In most such procedures a precipitate is formed when the two components are mixed and a precipitate manifestly cannot give good penetration. Also the ratio of components in the precipitate is fixed and may be different from the optimum ratio desired or that originally present in the solution. One prior art procedure proposes that compounds of nickel and tungsten as well as those of certain other metals such as cobalt and molybdenum be dissolved in a certain fashion and maintained in a strong ammoniacal solution during impregnation, whereby formation of a precipitate is avoided. Actually this procedure when applied to compounds of the particular metals under consideration, namely, nickel and tungsten also results in formation of a precipitate with the attendant disadvantages mentioned above when the components are mixed. Therefore uniform or predetermined deposition of the two components was not obtained.

This invention has for its object to provide an improved method for preparing a supported combination of nickel and tungsten oxide catalysts. Another object is to provide an improved procedure for preparing a nickel tungstate catalyst. A further object is to provide an improved process for preparing a supported nickel oxide-tungsten oxide catalyst whereby the ratio of nickel oxide to tungsten oxide in the final catalyst product can be varied at will. A still further object is to provide a process for obtaining a uniform deposit of combined nickel and tungsten oxides on a porous catalyst support. Other objects will appear hereinafter.

These and other objects are accomplished by our invention which comprises preparing an aqueous solution of ammonium meta tungstate, which solution has a pH of between about 2 and 5. This solution is mixed with a solution of a nickel salt while the pH of the mixture is maintained within the range of between about 2 and 5. This mixed solution is then mixed with a porous carrier to be impregnated. After penetration of the pores of the carrier by the solution the carrier is dried and calcined to convert the nickel and tungsten present into nickel and tungsten oxides which may be in combination as is the case with a nickel tungstate or which may be present as a uniform mixture. The term combined nickel oxide-tungsten oxide catalyst as used hereinafter is meant to include any compound, solid solution, or other intimate mixture of the oxides.

In carrying out our invention the ammonium meta tungstate solution is preferably prepared by reacting a slurry of tungstic acid with ammonium hydroxide (which may be added as such or formed in the reaction mixture by bubbling ammonia therethrough). It is necessary to limit the amount of ammonium hydroxide so that it is not present in excess of that required to react with the tungstic acid ($WO_3.H_2O$) to produce ammonium meta tungstate $(NH_4)_2W_4O_{13}.8H_2O$. If more than this amount of ammonium hydroxide is employed the reaction to form the insoluble ammonium tungstates such as ammonium para-tungstate, will be favored. Formation of these latter compounds is undesirable since they are practically insoluble, and it is difficult to get them into solution after they have been formed. Even when carrying out the solution of the tungstic acid with just enough ammonium hydroxide to form ammonium meta tungstate, some material remains undissolved since only about 75 to 90 per cent of the tungsten is found in the resulting solution. It is possible to minimize the amount of insoluble tungsten compounds by heating the mixture for a period of time. This expedient is advantageous but need not be used. Similarly, after the heating period it is desirable to allow the mixture to stand for some time in order to permit crystal growth in the undissolved material. The standing period need not be used but is advantageous. A suitable heating period is about two hours on a steam bath and a suitable standing period is about two to twenty-four hours.

From the foregoing it will be evident that the conditions are selected to favor the formation of ammonium meta tungstate and are such as to minimize formation of the relatively insoluble ammonium tungstates. As previously indicated there is danger of forming a precipitate of the insoluble tungstates if excess ammonium hydroxide is used. For this reason it is advantageous to use slightly less than the theoretical amount such as about 97 per cent of that required to form the ammonium meta-tungstate. This results in a slight margin of safety. Also it is desirable to permit sufficient time for fairly complete reaction to take place. If sufficient time is not allowed for the reaction between the tungstic acid and ammonium hydroxide to take place some ammonia as well as the desired meta-tungstate may remain in the filtered solution. This ammonia may subsequently react with the meta-tungstate and cause the formation of other ammonium tungstates in excess of their solubility and thus cause precipitation to take place.

Regardless of the particular sequence of steps employed after addition of ammonia, it is desirable to filter the solution to separate the insoluble materials such as unreacted tungstic acid, ammonium para tungstate and perhaps some ammonium acid tungstates. The pH of the filtrate will be approximately 5 if the amount of ammonium hydroxide used is about that required to form the meta tungstate. The importance of the amount of ammonium hydroxide employed is indicated by the fact that if small amounts of ammonium hydroxide are added to the aqueous solution prepared as described above and having a pH of 5 a precipitate will be formed. On the other hand the pH may be as low as 2 without undesirable consequences.

A solution containing the ammonium meta tungstate for use in accordance with our invention can be prepared by any other method as long as the pH range requirement is observed. For instance, it can be satisfactorily prepared by adding an excess of ammonium hydroxide to a slurry of tungstic acid to form ammonium para tungstate which is quite insoluble in water. If this reaction product is separated and baked in an oven for about two hours at 510° F., sufficient ammonia is lost to convert the material to the more soluble ammonium meta tungstate. This may be dissolved to form an aqueous solution for preparing a catalyst in accordance with our invention. When this is dissolved in water the pH of the solution will be about 2. The addition of a trace of acid to this solution causes a precipitate to form. It is thus evident that the pH of the solution must be maintained between about 2 and 5 if formation of a precipitate and loss of active component is to be avoided.

The concentration of the ammonium meta-tungstate solution can vary up to a maximum of about 45–50 per cent. This maximum is ordinarily obtained by starting with a more dilute solution and increasing the concentration by heating and evaporation. The concentration employed will be determined by the amount of tungsten to be incorporated on the porous carrier.

The aqueous solution containing the nickel salt which is to be added to the tungsten solution described above can be prepared in any desired manner. Any water soluble nickel salt such as nickel nitrate, chloride, or acetate may be simply dissolved in water to obtain a nickel salt solution having the desired concentration. This concentration will depend upon the amount of nickel to be present in the final catalyst product. We have found it to be convenient to employ a nickel nitrate solution containing the equivalent of about 20 per cent nickel oxide. The solution of the nickel salt must have a pH such that when it is added to the above described tungsten solution the pH of the resultant mixture will remain between the range of about 2 to 5. In most cases the acidity of the nickel salt solution will not be sufficient to require any neutralization. This is particularly true if the pH of the tungsten solution is near the upper limit of pH 5. However, if nickel nitrate containing substantial amounts of nitric acid as an impurity is to be added to a tungsten solution of pH 2 it is advisable to neutralize at least partially the acid content of the nickel solution prior to mixing. Otherwise the pH might be reduced below 2 where precipitation would occur. Nickel nitrate ordinarily does not contain more than about 2 per cent nitric acid and with such a nickel nitrate neutralization usually will not be necessary. If neutralization is required ammonium hydroxide is advantageously used.

The above described nickel and tungsten solutions can be mixed in any proportion and diluted if desired to give a stable stock solution for impregnating a porous carrier. With such a solution precipitation does not take place even in the presence of the porous carrier to be impregnated. The two solutions can be mixed in any desired ratio to give a predetermined nickel oxide-tungsten oxide ratio deposit upon impregnating a support. The optimum mol ratio of nickel to tungsten in the final catalyst when it is to be used for hydrocracking hydrocarbons is in the range 0.10:1 to 1.0:1.0. It is an outstanding advantage of our invention that such definite predetermined ratios can be obtained. This procedure is to be contrasted with the method of the prior art where, due to partial or complete precipitation from the solution before impregnation, alteration of the ratio of the deposit as well as unequal deposition on the support takes place.

The porous carrier can be impregnated using any method for introducing solutions of catalyst components into the pores of catalyst carriers. Such methods are well known. In general they comprise soaking the carrier in the solution. Evacuation of the carrier before or during impregnation improves penetration. After impregnation the solution and the porous carrier are separated and the porous carrier is then dried and calcined to convert the deposited nickel and tungsten combination into nickel and tungsten oxides or a combination thereof. Such drying and calcining operations are also well known in the prior art and do not necessitate detailed description here. In general drying at a temperature of 200° F. to 300° F. and a calcining temperature of 700° F. to 1200° F. may be used. We have found 250° F. and 1000° F., respectively, to be good operating temperatures for drying and calcining.

Any porous carrier may be employed in preparing the catalyst. For example activated alumina, silica gel, synthetic silica-alumina cracking catalysts, acid-activated natural clays, etc. may be used. The catalyst may be in small particle size, such as employed in a fluidized catalytic process, or it may be in the form of chunks, pellets or the like. A typical size analysis of a catalyst used in a fluidized process is

| | Percent |
|---|---|
| 80μ | 16 |
| 80–40μ | 45 |
| 40–20μ | 31 |
| 20–10μ | 7 |
| 10–0μ | 1 |

It is more satisfactory to impregnate such a catalyst before elutriation even though it may be elutriated after impregnation to remove some of the finest particle size fractions. It has been noted that there is an unexpected increase in activity with such non-elutriated small particle-size catalyst as compared with elutriated catalyst otherwise prepared in the same way.

*Example*

The ammonium meta tungstate solution was prepared as follows:

100 parts by weight of "Baker's C. P." finely divided tungstic acid, $WO_3 \cdot H_2O$, was slurried with 167 parts of distilled water at room temperature. To this slurry was added dropwise and with mechanical stirring 11.8 parts of bottle ammonia (28 per cent $NH_3$) diluted with 43 parts of distilled water. This mixture was allowed to stand for about two hours and then heated to near boiling temperature on a steam bath and allowed to cool and stand overnight. The slurry was filtered, and the solution was found to contain about 24.5 per cent $WO_3$ having a pH of about five. The solution contained about 73.8 per cent of the tungsten charged to the initial slurry. The remaining undissolved material might be reworked for further tungsten recovery. The $WO_3$ content of this solution was increased to 34.8 per cent (sp. gr.=ca. 1.69) by evaporation.

The nickel solution was prepared by dissolving 78.5 parts of nickel nitrate, $Ni(NO_3)_2 \cdot 6H_2O$, in 21.5 parts of distilled water. This solution contained 20 per cent NiO.

The impregnating solution was then prepared by mixing 2216 gms. of the 34.8 per cent $WO_3$ solution and 1248 grams of 20 per cent NiO solution and diluting this mixture to 8 liters with distilled water.

In carrying out the impregnation a round bottom flask containing 3803 grams of 1000° F. calcined microspheroidal synthetic silica-alumina cracking catalyst, MS-A (American Cyanamid Co.), was evacuated to 6–10 mm. Hg pressure; the line to the vacuum pump was closed, and the above prepared impregnating solution was introduced into the evacuated flask to submerge the MS-A support. The flask was allowed to remain under vacuum for five minutes and then at atmospheric pressure for ten minutes, after which period the excess liquid was removed from the impregnated mass. The mass was dried at about 250° F. for 24 hours and calcined by heating in air in an electric muffle furnace to 1000° F. for six hours and held at this temperature for about ten hours. It is estimated that this catalyst contained on a weight basis about 8.3 per cent $WO_3$ and 2.7 per cent NiO.

What we claim is:

1. A method of preparing a combined nickel oxide-tungsten oxide catalyst deposited upon a porous carrier which comprises preparing an aqueous solution of ammonium meta tungstate having a pH of between about 2 and 5, mixing therewith an aqueous solution of a nickel salt while maintaining the mixture within said pH range, impregnating a porous carrier with the mixed solution, and drying and calcining the impregnated carrier.

2. A method of preparing a combined nickel oxide-tungsten oxide catalyst deposited upon a porous carrier which comprises reacting a slurry of tungstic acid with ammonium hydroxide in an amount which is below about that required to form ammonium meta tungstate and which amount will result in a solution having a pH of between about 2 and 5, adding thereto an aqueous solution of a nickel salt which when added to said solution of ammonium meta tungstate will result in a mixed solution having a pH between about 2 and 5, impregnating a porous carrier with the mixed solution and drying and calcining the impregnated carrier.

3. The method of preparing a nickel oxide-tungsten oxide catalyst deposited on a porous carrier in which the mol ratio of nickel to tungsten is in the approximate range 0.10:1 to 1.0:1.0 which comprises preparing a solution containing the metal components in said mol ratio by reacting a slurry of tungstic acid with ammonium hydroxide in an amount which is below about that required to form ammonium meta tungstate and which results in a solution having a pH of between about 2 and 5, adding thereto an aqueous solution of a nickel salt which when added to said solution of ammonium meta tungstate will result in a mixed solution having a pH between about 2 and 5, impregnating a porous carrier with the mixed solution and drying and calcining the impregnated carrier.

4. A method of preparing a combined nickel oxide-tungsten oxide catalyst deposited upon a porous carrier which comprises reacting a slurry of tungstic acid with approximately 97 per cent of the amount of ammonium hydroxide required to form ammonium meta tungstate, thereby forming a solution having a pH of between about 2 and 5, adding thereto an aqueous solution of a nickel salt which when added to said solution of ammonium meta tungstate will result in a mixed solution having a pH between about 2 and 5, impregnating a porous carrier with the mixed solution and drying and calcining the impregnated carrier.

5. A method of preparing a combined nickel oxide-tungsten oxide catalyst deposited upon a porous carrier which comprises reacting a slurry of tungstic acid with ammonium hydroxide in an amount which is below about that required to form ammonium meta tungstate and which amount will result in a solution having a pH of between about 2 and 5, preparing an aqueous solution of nickel nitrate, adjusting the pH of this solution with ammonia so that when it is added to said solution of ammonium meta tungstate the mixed solution will have a pH between about 2 and 5, mixing said solutions, impregnating a porous carrier with the mixed solution and drying and calcining the impregnated carrier.

6. A method of preparing a combined nickel oxide-tungsten oxide catalyst deposited upon a porous carrier which comprises reacting a slurry of tungstic acid with ammonium hydroxide in an amount which is not in excess of that required to form ammonium meta tungstate and which amount will result in a solution having a pH of between about 2 and 5, adding thereto an aqueous solution of a nickel salt which when added to said solution of ammonium meta tungstate will result in a mixed solution having a pH between about 2 and 5, impregnating unelutriated microspheres of synthetic silica-alumina cracking catalyst with the mixed solution and drying and calcining the impregnated silica-alumina catalyst.

7. A method of preparing a combined nickel oxide-tungsten oxide catalyst deposited upon a porous carrier which comprises reacting a slurry of tungstic acid with approximately 97 per cent of the amount of ammonium hydroxide required to form ammonium meta tungstate, thereby forming a solution having a pH of about 5, heating the solution, permitting the solution to stand for about two to twenty-four hours, filtering the solution, adding thereto an aqueous solution of nickel nitrate which when added to said solution of ammonium meta tungstate will result in a mixed solution having a pH between about 2 and 5, impregnating a porous carrier with the mixed solution and drying and calcining the impregnated carrier.

8. The method of preparing a combined nickel oxide-tungsten oxide catalyst deposited upon a porous carrier which comprises roasting ammonium para tungstate to form ammonium meta tungstate, dissolving the ammonium meta tungstate in water to form a solution having a pH of about 2, adding thereto an aqueous solution of a nickel salt having a pH such that the mixed solution will have a pH of between 2 and 5, impregnating a porous carrier with the mixed solution and drying and calcining the impregnated carrier.

References Cited in the file of this patent

UNITED STATES PATENTS

| | | |
|---|---|---|
| 2,258,111 | Engel | Oct. 7, 1941 |
| 2,486,361 | Nahin et al. | Oct. 25, 1949 |